US Patent [19] 4,211,861
Stenzenberger                [45] Jul. 8, 1980

[54] THERMOSETTING IMIDE RESINS FROM AMINO ACID HYDRAZIDE

[75] Inventor: Horst Stenzenberger, Schriesheim, Fed. Rep. of Germany

[73] Assignee: Technochemie GmbH Verfahrenstechnik, Dossenheim, Fed. Rep. of Germany

[21] Appl. No.: 964,664

[22] Filed: Nov. 29, 1978

[30] Foreign Application Priority Data

Dec. 8, 1977 [DE] Fed. Rep. of Germany ....... 2754632

[51] Int. Cl.$^2$ ............................................. C08G 73/12
[52] U.S. Cl. .................... 528/322; 260/30.2; 260/32.6 NA; 260/37 N; 428/474; 528/170; 528/210; 528/211; 528/321; 528/310; 528/331
[58] Field of Search ............... 528/322, 170, 210, 211, 528/310

[56] References Cited
U.S. PATENT DOCUMENTS 3,669,930  6/1972  Asahara et al. ...................... 528/322

*Primary Examiner*—Harold D. Anderson
*Attorney, Agent, or Firm*—Schwartz, Jeffery, Schwaab, Mack, Blumenthal & Koch

[57] ABSTRACT

Novel thermosetting imide resins are obtained by reacting an N,N'-bisimide of an unsaturated dicarboxylic acid with the hydrazide of an amino acid, preferably in the molar proportion between about 1.1 and about 10.0. The resulting prepolymerization products can also be prepared in organic solvents or diluents. By heating at atmospheric pressure or under pressure to a temperature between about 100° C. and about 350° C. and preferably between about 160° C. and 260° C., if desired, in the presence of curing catalysts or inhibitors, the prepolymerization products are cured and hardened to substantially insoluble, infusible, highly cross-linked imide resins of superior stability at high temperatures. Solutions of the prepolymerization products have the advantage that they are stable at room temperature for an almost unlimited period of time without any substantial increase in their viscosity.

15 Claims, No Drawings

THERMOSETTING IMIDE RESINS FROM AMINO ACID HYDRAZIDE

BACKGROUND OF THE INVENTION (1) Field of the Invention

The present invention relates to novel and improved thermosetting imide resins, to a process of making same, and to a method and compositions of using such resins.

(2) Description of the Prior Art

It is known that the ethylenic double bond of maleic acid imides can readily be reacted with basic organic compounds such as amines. Thereby, aspartic acid imides are formed. This reaction has been used for the preparation of polymerizable imide resins as they are described in U.S. Pat. No. 3,562,223. The speed of said reaction is determined to a large extent by the basicity of the amino compound used as the one reactant.

SUMMARY OF THE INVENTION

It is one object of the present invention to provide novel thermosetting imide resins with superior properties.

Another object of the present invention is to provide a simple and effective process of producing such novel and advantageous imide resins.

Another object of the present invention is to provide compositions containing such imide resins.

A further object of the present invention is to provide a method of using such compositions for producing articles therefrom.

Still another object of the present invention is to provide novel and improved articles produced by using such thermosetting imide resins.

Other objects of the present invention and advantageous features thereof will become apparent as the description proceeds.

In principle, the novel and advantageous thermosetting imide resins according to the present invention are obtained by reacting an N,N'-bisimide of an unsaturated dicarboxylic acid of the Formula I

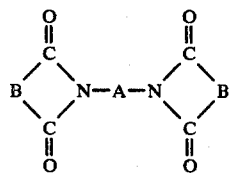
I.

in which

B is a divalent group containing a carbon to carbon double bond, while

A is a divalent group with at least two carbon atoms, with a hydrazide of an amino acid of the following Formula II

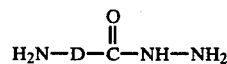
II.

in which

D is a divalent group.

The group designated by A in Formula I can be
an alkylene group with 2 to 12 carbon atoms,
a cycloalkylene group with 5 or 6 carbon atoms,
a heterocyclic group with 4 or 5 carbon atoms and at least one nitrogen, sulfur, or oxygen atom in the heterocyclic ring,
a mono- or dicarbocyclic group, or
at least two mono- or dicarbocyclic aromatic or cycloalkylene groups which are linked to each other by
a direct carbon to carbon bond or by
a divalent group such as
  oxygen,
  sulfur,
  alkylene with 1 to 3 carbon atoms, or
  one of the groups of the following formulas:

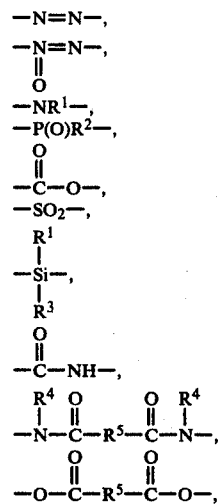

in which formulas the groups $R_1$, $R_2$, $R^3$, $R^4$, and $R^5$ are alkyl with 1 to 5 carbon atoms.

The group B in Formula I is a divalent organic group which contains an ethylenic double bond. Group B may be a group of the following structural formulas:

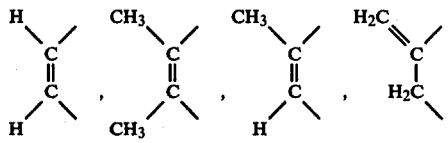

Bisimides which are suitable for producing the novel imide resins are, for instance,
1,2-Bismaleimido ethane,
1,6-bismaleimido hexane,
1,12-bismaleimido dodecane,
1,6-bismaleimido-(2,2,4-trimethyl) hexane,
1,3-bismaleimido benzene,
1,4-bismaleimido benzene,
4,4'-bismaleimido diphenylmethane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene bis-citraconimide,
N,N'-4,4'-diphenyl methane bis-citraconimide,
N,N'-4,4'-diphenyl methane bis-itaconimide,
and others.

Mixtures of two or more of the above mentioned bisimides can also be used for producing the imide resins according to the present invention.

Amino acid hydrazides which are especially suitable for carrying out the present invention are, for instance, the following amino acid hydrazides:
Amino acetic acid hydrazide
alanine hydrazide,
leucine hydrazide,
isoleucine hydrazide,
phenyl alanine hydrazide,
valine hydrazide,
β-alanine hydrazide,
γ-amino butyric acid hydrazide,
α-amino butyric acid hydrazide,
ε-amino caproic acid hydrazide,
amino valeric acid hydrazide,
and other aliphatic amino acid hydrazides. Aromatic amino acid hydrazides such as
p-amino benzoic acid hydrazide,
m-amino benzoic acid hydrazide,
anthranilic acid hydrazide,
and other aromatic amino carboxylic acid hydrazides which are substituted by alkyl and correspond to the following Formula III

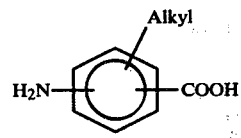

or amino acids of the diphenyl type of the following Formula IV

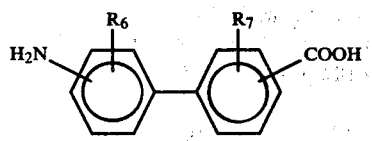

in which
$R_6$ and $R_7$ are hydrogen or lower alkyl or polynuclear aromatic amino acids of the following Formula V

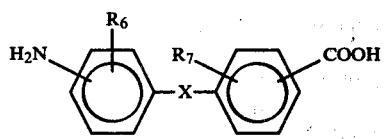

in which
X is oxygen, sulfur, the sulfone group —$SO_2$—, or the methylene group —$CH_2$—,
or amino acids of the naphthalene series of the following Formula VI:

can also be used as the amino acid hydrazide reactant.

The reaction of the bisimides with the amino acid hydrazides to form the imide resin is carried out in such a manner that the molar proportion of bisimide to amino acid hydrazide is between 1.1 and 10.0 according to the following equation $$\frac{\text{Number of moles of N,N'-bisimide of Formula I}}{\text{Number of moles of amino acid hydrazide of Formula II}}$$

Surprisingly, the hydrazides of amino acids are added to the double bond of the unsaturated acid bisimide at a high speed of reaction although the basicity of the hydrazide group is quite low. Polymerizable imide resins are produced successfully according to the present invention by the heretofore unknown reaction procedure of reacting the bismaleimides or the like bisimides with hydrazides of amino acids preferably in such a manner that an excess of the bisimide is used. As stated above, the molar proportion of the two reactants to be employed for the reaction is between 1.1 and 10.0.

Production of the novel imide resins is preferably carried out in an inert polar organic solvent or diluent, for instance, in dimethyl formamide, dimethyl acetamide, N-methyl pyrrolidone, tetramethyl urea, and the like. Solvents of a low boiling point such as dioxane or tetrahydrofurane can also be used for producing the prepolymerization products of this invention. Formation of the prepolymerization products is preferably carried out in the above mentioned diluents when further processing requires the use of a solution.

The imide resins of the present invention can also be produced by intimately mixing the starting materials by means of conventional mixing and pulverizing methods. Subsequently the mixtures are heated to a temperature between about 80° C. and about 180° C. for a predetermined period of time in such a manner that a product is produced which can still be molded and, if desired, may also be soluble.

The production of the imide resins according to the present invention can also be effected in an inert diluent in which one of the two starting reactants or both are insoluble. This mode of procedure is advantageously carried out if prepolymerization should not proceed too far.

For many technical applications of the new imide resins it is of advantage to accelerate hardening or curing by the addition of catalysts. Effective curing catalysts are, for instance, organic peroxides, such as di-tertiary butyl peroxide, dicumyl peroxide, tertiary butyl perbenzoate, and the like. The accelerators are added in amounts of 0.1% to 0.5%, calculated for the total weight of the hardenable or curable imide resin. If catalysts are used, they are preferably admixed to the starting materials, when producing the prepolymerization product, by means of one of the above mentioned techniques. When using the new imide resins for other technical applications, it is of advantage to retard curing or setting which proceeds via a vinyl polymerization. In such instances the production of the imide resins is carried out in the presence of polymerization inhibitors, for instance, of hydroquinone. The amounts of inhibitor added are between about 0.1% and about 1.0%.

Complete curing or thermosetting of the imide resins is effected by heating the resins to temperatures between about 100° C. and about 350° C., if required, under pressure. The preferred temperatures are between 160° C. and 260° C. When proceeding in this manner, insoluble, infusible, cross-linked products which are of excellent thermal stability, are obtained. A preferred field of application of the new imide resins are laminated molded articles. Processing is effected in such a manner that the imide resins are dissolved in solvents of a high boiling point, such as N-methyl pyrrolidone, dimethyl acetamide, dimethyl formamide, or the like. Glass fibers in the form of rovings or webs, carbon fibers, boron fibers, organic synthetic fibers in the form of webs, filaments, or rovings are coated or impregnated with such a solution. Subsequently, the solvent is removed by evaporation and the resulting impregnated fiber material is compressed to the laminated molded article by the use of pressure and high temperature.

A noteworthy advantage of the imide resins according to the present invention over the resins of the above mentioned U.S. Pat. No. 3,562,223 is to be seen in the fact that the solutions of the novel imide resins in the above mentioned solvents are stable at room temperature to an almost unlimited extent without any increase in the viscosity of the resin solutions. As a result thereof, impregnated fiber materials, so-called prepregs which may have a residual solvent content of up to 10%, are also stable and storable to a practically unlimited extent without any changes in the characteristic flowability which is of importance for further processing of such prepregs.

The imide resins according to the present invention can also be processed to molded articles according to known methods of powder molding techniques as they are employed in curing or thermosetting plastic materials. To achieve this result hardening or curing takes place under pressure whereby molding is effected at the same time. For such a use the imide resins are mixed with conventional additives such as fillers, pigments, plasticizers, flameproofing agents, and the like. Especially suitable fillers are, for instance, glass fibers, carbon fibers, organic high-modulus fibers such as aramides, quartz powder, Kaolin, silicon dioxide, and metals in the form of fine powders.

DESCRIPTION OF THE PREFERRED EMBODIMENTS

The following examples serve to illustrate the present invention without, however, limiting the same thereto.

EXAMPLE 1

107.5 g. (0.3 moles) of 4,4'-bismaleimido diphenyl methane and 18.12 g. (0.12 moles) of m-amino benzoic acid hydrazide are intimately mixed in a ball mill to yield a homogeneous powder. The resulting mixture is subjected to preliminary reaction by keeping it in a drying chamber which has been preheated to 170° C. for 35 minutes. A homogeneous, clear, highly viscous melt of the prepolymerization product is obtained. Processing of said melt can be carried out in the following manner:

(a) The melt is cast into molds (100 mm.×100 mm.×3 mm.) which have been preheated to 170° C. Curing or hardening of the melt is completed by gradually increasing the temperature to 200° C. within three hours and maintaining it at said temperature of 200° C. for three more hours.

(b) The cooled melt is comminuted and the resulting powder is dissolved in dimethyl acetamide to yield a 50% solution. Said solution has a kinematic viscosity of 71 centistokes. The viscosity of the solution remains practically unchanged even on storing the solution for more than eight weeks. A solution of such a viscosity is especially suitable for producing pre-impregnated glass fiber webs. Glass fiber webs of the type 92111/A1100 (Products of the firm Interglas of Ulm, Federal Republic of Germany) are homogeneously impregnated by dipping them into the resin solution. The impregnated glass fiber web is dried in a dryer with recycle of air at 140° C. for 10 minutes so as to evaporate the solvent. Several pre-impregnated glass fiber webs are placed one upon the other into a plate press and are compressed under a pressure of 50 kp./sq.cm. at 200° C. for about 2 hours so as to form a laminated article in which the hardened resin is the binding agent.

EXAMPLE 2

70 g. (0.196 moles) of 4,4'-bismaleimido diphenyl methane, 30 g. (0.105 moles) of 2,4-bismaleimido toluene, and 18.12 g. (0.12 moles) of p-amino benzoic acid hydrazide are intimately mixed in a ball mill and are kept in a dryer with recycle of air at 170° C. for about 45 minutes. The resulting melt is highly viscous and, after cooling, is ground to yield a fine powder. The prepolymerization product can be further processed as described in Example 1.

EXAMPLE 3

72 g. (0.2 moles) of 4,4'-bismaleimido diphenyl ether, 30 g. (0.105 moles) of 2,4-bismaleimido toluene, and 15.52 g. (0.1 moles) of ε-amino caproic acid hydrazide are molten and are degassified in a round bottom flask at 145° C. The melt is cast into a casting mold (100 mm.×100 mm.×3 mm.) to yield a plate which is cured by heating at 200° C. for three hours. The resulting plate is cut in the shape of test specimens of 40 mm.×10 mm.×3 mm. which are tested according to the specification DIN 53452 in a three-point transverse flexural test. The flexural strength is 920 kp/sq.cm. After storing the specimen for 500 hours in a dryer with recycle of air at 250° C. the residual flexural strength is still 710 kp/sq.cm.

EXAMPLE 4

72 g. (0.2 moles) of 4,4'-bismaleimido diphenyl ether, 30 g. (0.105 moles) of 2,4-bismaleimido toluene, and 11.7 g. (0.1 moles) of γ-amino butyric acid hydrazide are dissolved at 70° C. with stirring in 113.7 g. of N-methyl pyrrolidone to yield a 50% solution. The resulting solution is kept at said temperature for three more hours. It is used for impregnating 12 cut glass fiber webs of the size 15 cm.×15 cm. (web type G92111/A1100). The web impregnated with the prepolymerization product is dried in a vacuum dryer with recycle of air at a temperature of 140° C. for 11 minutes. The impregnated glass fiber webs are then placed one upon the other into a plate press and are pressed and hardened at a temperature of 220° C. and under a pressure of 20 kp./sq.m. to yield a glass fiber web laminate. The laminated article shows the following properties:
Resin content: 29% by weight.
Flexural strength: 58 kp./sq.cm.
Flexural E-modulus: 2560 kp./sq.cm.
Interlaminar shear strength: 5.8 kp./sq.cm.

EXAMPLE 5

36 g. of 1,12-bismaleimido dodecane and 9.0 g. of amino acetic acid hydrazide are reacted in dimethyl acetamide at 70° C., while stirring, to yield a 50% solution of the prepolymerization product. This solution is especially suitable as an adhesive for cementing metals.

EXAMPLE 6

36 g. of bismaleimido dodecane and a mixture of 1.3 g. of γ-amino valeric acid hydrazide and 2.35 g. of α-amino butyric acid hydrazide are molten and degassified by heating to 150° C. in a round bottom flask. The resulting prepolymerization product is especially suitable for preparing adhesive resin solutions. As solvents there are used combinations of toluene, xylene, ethyl benzene, and dimethyl acetamide.

The procedure is the same as described in the preceding examples whereby, however, other bisimides and other hydrazides are used as reactants as they are given hereinafter:

| Example | Bisimide | Hydrazide |
|---|---|---|
| 7 | 1,2-bismaleimido ethane | alanine hydrazide |
| 8 | 1,6-bismaleimido hexane | leucine hydrazide |
| 9 | 1,6-bismaleimido-(2,2,4-trimethyl) hexane | isoleucine hydrazide |
| 10 | 1,3-bismaleimido benzene | β-alanine hydrazide |
| 11 | 4,4'-bismaleimido diphenyl sulfide | phenyl alanine hydrazide |
| 12 | 4,4'-bismaleimido diphenyl sulfone | α-amino butyric acid hydrazide |
| 13 | 4,4'bismaleimido dicyclohexyl methane | α-amino valeric acid hydrazide |
| 14 | N,N'-m-xylylene bismaleimide | anthranilic acid hydrazide |
| 15 | N,N'-m-phenylene biscitraconimide | 2,4-amino toluic acid hydrazide |
| 16 | N,N'-4,4'-diphenyl methane bis-citraconimide | 4,4'-amino diphenyl carboxylic acid hydrazide |
| 17 | N,N'-4,4'-diphenyl methane bis-itaconimide | 4,4'-amino diphenyl ether carboxylic acid hydrazide |
| 18 | 1,2-bismaleimido ethane | 2,7-amino naphthalene carboxylic acid hydrazide |

The group designated by A in Formula I as given hereinabove may also correspond, in addition to the groups as listed previously, to the following formulas:

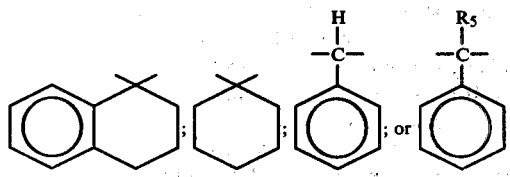

the substituent $R_5$ being alkyl with one to six carbon atoms, cycloalkyl with five or six carbon atoms, or mono- or dicarbocyclic aryl.

The group designated by B in Formula I as given hereinabove, i.e. a group which is capable of addition polymerization, may correspond, in addition to the groups listed previously, to one of the following groups

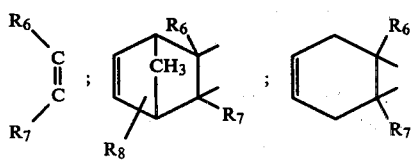

in which $R_6$, $R_7$, and $R_8$ are hydrogen or alkyl with 1 to 6 carbon atoms.

Compounds of this type which can also be used as the bisimide reactant, are, for instance, bis-tetrahydrophthalimide, bis-endomethylene tetrahydrophthalimide, N,N'-4,4'-bismaleimido azobenzene; N,N'-4,4'-bismaleimido diphenyl silane, N,N'-4,4'-bismaleimido diphenyl phosphine oxide, N,N'-1,5-bismaleimido naphthalene, N,N'-2,6-bismaleimido pyridine, N,N'-2,5-bismaleimido furane, N,N'-2,5-bismaleimido pyrrole, and the like compounds.

As stated above, there can also be used as the hydrazide reactant heterocyclic amino carboxylic acid hydrazides such as 2,6-amino pyridine carboxylic acid hydrazide, 2,4-amino pyrrole carboxylic acid hydrazide, 2,5-amino furane carboxylic acid hydrazide, and the like compounds.

Although the molar proportion of the bisimide to the amino acid hydrazide is preferably between 1.1 and 10.0, it may also be between 1.1 and 100.0, i.e. that there is always present an excess of the bisimide.

Suitable peroxide accelerators, in addition to those mentioned hereinabove, are, for instance, dilauryl peroxide, tertiary butyl cumyl peroxide, and the like peroxides, or azo-bisisobutyronitrile, and the like compounds.

Of course, many changes and variations in the reaction conditions, the temperature and duration, the reactants employed, the solvents and diluents as well as polymerization accelerators or inhibitors used, the compositions made from the resulting prepolymerization products, the imide resins obtained, the duration, temperature and pressure under which the hardened or cured imide resins are obtained, the methods of using said prepolymerization products, and the articles made therefrom and from the cured thermosetting imide resins, and the like may be made by those skilled in the art in accordance with the principles set forth herein and in the claims annexed hereto.

I claim:

1. A thermosetting imide resin obtained by reacting at least one N,N'-bisimide of an unsaturated dicarboxylic acid of the formula

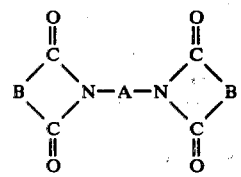

in which

A is a divalent organic group with at least two carbon atoms and

B is a divalent organic group having a carbon to carbon double bond and being capable of addition polymerization, with at least one hydrazide of an amino acid of the formula

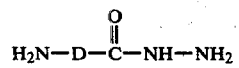

in which

D is a divalent organic group, the molar proportion of the reactants in said imide resin being between about 1.1 and 10.0 according to the equation $$\frac{\text{Number of molecules of the N,N'-bisimide}}{\text{Number of molecules of the amino acid hydrazide}}.$$

2. The thermosetting imide resin of claim 1, in which the bisimide used as the one reactant is a bisimide selected from the group consisting of
1,2-bismaleimido ethane,
1,6-bismaleimido hexane,
1,12-bismaleimideo dodecane,
1,6-bismaleimido-(2,2,4-trimethyl) hexane,
1,3-bismaleimido benzene,
1,4-bismaleimido benzene,
4,4'-bismaleimido diphenyl methane,
4,4'-bismaleimido diphenyl ether,
4,4'-bismaleimido diphenyl sulfide,
4,4'-bismaleimido diphenyl sulfone,
4,4'-bismaleimido dicyclohexyl methane,
2,4-bismaleimido toluene,
2,6-bismaleimido toluene,
N,N'-m-xylylene bismaleimide,
N,N'-p-xylylene bismaleimide,
N,N'-m-phenylene biscitraconimide,
N,N'-4,4'-diphenyl methane biscitraconimide and
N,N'-4,4'-diphenyl methane bisitaconimide,
while the amino acid hydrazide is a hydrazide of the formula

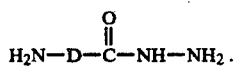

3. The thermosetting imide resin of claim 1, in which the bisimide reactant is a bisimide of the formula

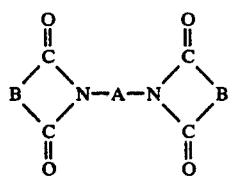

as given in claim 1, which the amino acid hydrazide is an amino acid hydrazide selected from the group consisting of
amino acetic acid hydrazide,
alanine hydrazide,
leucine hydrazide,
isoleucine hydrazide,
phenyl alanine hydrazide,
valine hydrazide,
β-alanine hydrazide,
γ-amino butyric acid hydrazide,
α-amino butyric acid hydrazide,
ε-amino caproic acid hydrazide, and
amino valeric acid hydrazide,
aromatic amino acid hydrazides selected from the group consisting of
p-amino benzoic acid hydrazide,
m-amino benzoic acid hydrazide,
anthranilic acid hydrazide,
aromatic amino acid hydrazides substituted by alkyl of the formula

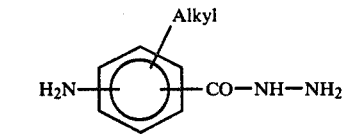

amino acid hydrazides of the diphenyl series of the formula

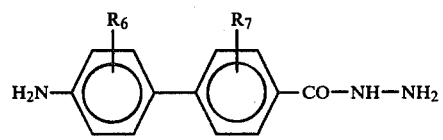

in which
the groups $R_6$ and $R_7$ are hydrogen or methyl,
polynuclear aromatic amino acid hydrazides of the formula

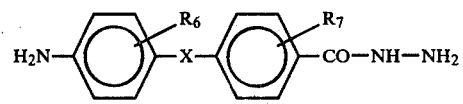

in which
X is oxygen, sulfur, the sulfide group, the sulfone group $SO_2$—, or the methyl group —$CH_2$—, the group $R_6$ and $R_7$ are hydrogen or methyl, and
amino naphthalene carboxylic acid hydrazides of the formula

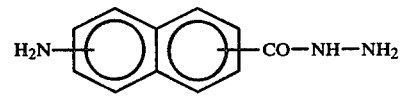

4. The thermosetting imide resin of claim 1, said resin being obtained from mixtures of bisimides of the formula given in claim 1.

5. The thermosetting imide resin of claim 1, said resin being obtained from mixtures of the amino acid hydrazides of the formula given in claim 1.

6. The thermosetting imide resin of claim 1, in which 4,4'-bismaleimido diphenyl methane and m-amino benzoic acid hydrazide in the molar proportion between about 1.1 and about 10.0 are used as reactants to produce the imide resin.

7. The thermosetting imide resin of claim 1, said resin containing an organic peroxide curing catalyst.

8. The thermosetting imide resin of claim 1, said resin containing a curing inhibitor.

9. In a process of producing a thermosetting imide resin, the step which comprises heating an N,N'-bisimide of an unsaturated dicarboxylic acid of the formula

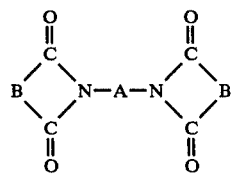

in which
 B is a divalent group containing a carbon to carbon double bond and
 A is a divalent group with at least two carbon atoms, with the hydrazide of an amino acid of the formula

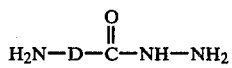

in which
 D is a divalent organic group in the molar proportion between 1.1 and 10.0 in accordance with the equation $$\frac{\text{Number of moles of the N,N'-bisimide}}{\text{Number of moles of the amino acid hydrazide}}$$

at a temperature between about 70° C. and about 180° C. for a period of time sufficient to yield a moldable and curable, thermosetting prepolymerized imide resin.

10. The process of claim 9, in which the two reactants are heated in an organic diluent.

11. The process of claim 9, comprising the additional step of hardening and curing the prepolymerized imide resin by further heating the same to a temperature between about 100° C. and about 350° C. to yield a substantially insoluble, infusible, cross-linked polymerized imide resin of high thermal stability.

12. The process of claim 11, in which the additional step is carried out with the addition of a curing accelerating catalyst.

13. The process of claim 11, in which the step of producing the prepolymerized imide resin is carried out with the addition of a curing inhibiting agent.

14. The solution of the moldable and curable, thermosetting, prepolymerized imide resin of claim 1 in an inert, polar organic solvent, said solution stable on storage for a prolonged period of time without its viscosity substantially increasing during storage.

15. The thermosetting imide resin of claim 1, in which the group B of the N,N'-bisimide of an unsaturated dicarboxylic acid is a divalent organic group of the formula

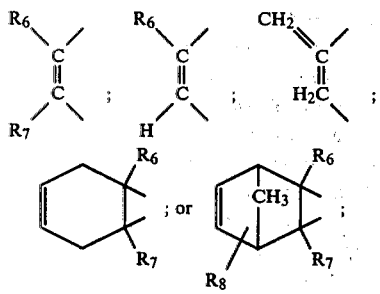

$R_6$, $R_7$, and $R_8$ in said formulas being hydrogen or alkyl with one to five carbon atoms.